United States Patent
MacMillan et al.

(10) Patent No.: US 12,488,705 B2
(45) Date of Patent: Dec. 2, 2025

(54) SYNTHETIC THROMBUS MODEL FOR LEARNING THE SURGICAL REMOVAL OF A BLOOD CLOT IN THE CONTEXT OF A TREATMENT SIMULATION

(71) Applicant: TECHNISCHE UNIVERSITÄT HAMBURG, Hamburg (DE)

(72) Inventors: Nadine MacMillan, Hamburg (DE); Dieter Krause, Buchholz (DE); Jens Fiehler, Hamburg (DE); Helena Guerreiro, Hamburg (DE); Anna Kyselyova, Hamburg (DE)

(73) Assignee: TECHNISCHE UNIVERSITÄT HAMBURG, Hamburg (DE)

( * ) Notice: Subject to any disclaimer, the term of this patent is extended or adjusted under 35 U.S.C. 154(b) by 121 days.

(21) Appl. No.: 18/560,045

(22) PCT Filed: May 10, 2022

(86) PCT No.: PCT/EP2022/062649
§ 371 (c)(1),
(2) Date: Nov. 9, 2023

(87) PCT Pub. No.: WO2022/238408
PCT Pub. Date: Nov. 17, 2022

(65) Prior Publication Data
US 2024/0290224 A1 Aug. 29, 2024

(30) Foreign Application Priority Data
May 12, 2021 (DE) .................. 10 2021 112 467.0

(51) Int. Cl.
*G09B 23/30* (2006.01)
*C08K 5/47* (2006.01)
(Continued)

(52) U.S. Cl.
CPC .............. *G09B 23/34* (2013.01); *C08K 5/47* (2013.01); *C08L 5/12* (2013.01); *C08L 83/04* (2013.01);
(Continued)

(58) Field of Classification Search
CPC ................................ G09B 23/28; G09B 23/30
See application file for complete search history.

(56) References Cited

U.S. PATENT DOCUMENTS 8,920,176 B1 * 12/2014 Yang .................... G09B 23/303
434/262
10,029,418 B2 * 7/2018 Misawa ................ B29C 64/124
(Continued)

FOREIGN PATENT DOCUMENTS

DE 28 32 536 C2 4/1988
FR 3086089 A1 * 3/2020 ............. G09B 23/28
(Continued)

OTHER PUBLICATIONS

William, M. et al.,"Quantifying the mechanical and histological properties of thrombus analog made from human blood for the creation of synthetic thrombus for thrombectomy device testing", Journal of Neurointerventional Surgery, Dec. 1, 2018, vol. 10, No. 12, S. 1168-1173, bzw. S.1-6.
(Continued)

*Primary Examiner* — Kurt Fernstrom
(74) *Attorney, Agent, or Firm* — Kilpatrick Townsend & Stockton LLP

(57) ABSTRACT

Synthetic thrombus model for learning the surgical removal of a blood clot from a blood vessel using mechanical thrombectomy in a simulation of various stroke scenarios in a training model, which simulates a lifelike shape with a realistic feel of a human blood clot thereby that an elongated base body based on an elastically deformable main material
(Continued)

with a Shore A hardness in the range of 0 to 10 is provided, the property profile of which at least with respect to hardness and fragmentation is improved by providing a material combination of the main material with at least one addition of an adhesive with 5 to 40 wt.-% and/or with a reinforcing material.

20 Claims, 3 Drawing Sheets

(51) Int. Cl.
  *C08L 5/12* (2006.01)
  *C08L 83/04* (2006.01)
  *G09B 23/34* (2006.01)
(52) U.S. Cl.
  CPC ........ *G09B 23/303* (2013.01); *C08L 2203/02* (2013.01)

(56) References Cited

U.S. PATENT DOCUMENTS

| | | | |
|---|---|---|---|
| 10,229,615 B2 * | 3/2019 | Carson | G09B 23/32 |
| 2005/0016548 A1 * | 1/2005 | Brassel | B29C 49/0042 |
| | | | 128/898 |
| 2008/0076101 A1 * | 3/2008 | Hyde | G09B 23/30 |
| | | | 156/61 |
| 2010/0041005 A1 * | 2/2010 | Campbell | G09B 23/28 |
| | | | 434/267 |
| 2010/0196867 A1 * | 8/2010 | Geerligs | G09B 23/28 |
| | | | 434/272 |
| 2018/0225994 A1 * | 8/2018 | Kerins | B29C 39/10 |
| 2019/0340956 A1 * | 11/2019 | Lindkvist | G09B 23/285 |
| 2020/0005679 A1 * | 1/2020 | Grubbs | G09B 23/28 |
| 2023/0410688 A1 * | 12/2023 | Yamanaka | G09B 23/285 |

FOREIGN PATENT DOCUMENTS

| | | | | |
|---|---|---|---|---|
| WO | WO-2020168054 A1 * | 8/2020 | | A61B 6/583 |
| WO | WO-2020250338 A1 * | 12/2020 | | G09B 23/28 |
| WO | WO-2021094428 A1 * | 5/2021 | | G09B 23/285 |
| WO | 2022/238408 A1 | 11/2022 | | |

OTHER PUBLICATIONS

German Office Action for file No. 10 2021 112 467.0 dated Jan. 11, 2023, all pages.

* cited by examiner

SYNTHETIC THROMBUS MODEL FOR LEARNING THE SURGICAL REMOVAL OF A BLOOD CLOT IN THE CONTEXT OF A TREATMENT SIMULATION

CROSS REFERENCE TO RELATED APPLICATIONS

This application is a 371 National phase filing of PCT/EP2022/062649, filed May 10, 2022, which application claims priority to German Patent Application No. 10 2021 112 467.0, filed May 12, 2021, the contents of which are hereby incorporated by reference in their entirety for all purposes.

The invention relates to a synthetic thrombus model for learning the surgical removal of a blood clot by means of a clinical testing procedure. For this purpose, a relevant vascular tree of a human with a blood circulation replacement system is provided in a training model and the training of stroke scenarios using a phantom of a blood clot, i.e. a synthetic thrombus model made of an equivalent material, is enabled.

Ischemic stroke is one of the major factors leading to disability and death worldwide. The most common cause of acute stroke is occlusion of a cerebral artery, leading to oxygen deprivation of a brain region and thus to cerebral infarction. The first-line therapy for such acute vascular occlusions is reopening via a catheter-based treatment called thrombectomy. Drugs inducing an anticoagulant effect, such as those known from DE 28 32 536 C2, which are intended to prevent the formation of thrombi and specify agarose, for example, as the carrier material for this purpose, do not help in these medical emergency situations.

Thrombectomy is a minimally invasive treatment used in strokes. A stent retriever is used to mechanically remove the brain-clogging blood clot (thrombus). In a clinic procedure case this is performed under high time pressure with the aim of reopening the affected vessel as quickly as possible and becomes a challenge for the physician in charge due to patient-specific variables such as vessel curves and constrictions. Therefore, continuous training and confident control of thrombectomy techniques is essential for the physician.

A common training model for thrombectomy is the porcine animal model. Training is performed on live pigs that are processed and anesthetized for these purposes. In this process, the pig's own blood is drawn, clotted in a process, and then re-injected to induce strokes. In this process, the pig is usually euthanized after several training procedures.

Animal experiments for training and further education purposes in stroke clinic procedure must be reduced or completely abandoned for which purpose, however, an animal-blood-free substitute material for thrombi must be provided. For example, the use of a synthetic thrombus made of polyurethane is well known. However, such synthetic simulation models suffer from the deficiency that the diversity of human thrombi cannot be represented.

Indeed, depending on how they form, thrombi have different compositions of their essential components of erythrocytes, fibrin and calcium. A thrombus is a solid mass formed by an endogenous clotting cascade due to injury to a blood vessel or a significant reduction in blood flow. Different proportions of erythrocytes, fibrin and calcium result in different physical properties of these thrombi, leading to different behavior in hardness and fragmentation as well as elasticity. So-called red thrombi have more erythrocytes and thus also differ visually from white thrombi, which contain more fibrin and calcium. Between these types of thrombus lies a high diversity of mixed thrombus types and their major components. Thus, the range of human thrombi is high, so they have different properties, showing different behavior during treatment. The mechanical properties of thrombi resemble viscoelastic polymers. The usual dimensions of thrombi are 6 to 15 mm in length and 1 to 3 mm in diameter.

Another thrombus alternate known is one made of non-biological components, namely water, guaran, glycerin, talcum powder and borax. Borax belongs to a hazardous substance category as toxic for reproduction. In addition, it is not known whether different types of thrombus can be produced. Consequently, the variety of different types of thrombus is not taken into account.

Therefore, it is an object of the invention to provide an animal component-free thrombus model for a training environment for endovascular, stroke clinic procedures under standardized conditions, preferably with different levels of difficulty enabling training of thrombectomy under real conditions in a training model, in particular neurointerventional training model.

The object is solved by the features of claim 1.

Herewith provided is a synthetically produced thrombus model that can vary in its properties in order to be able to mimic the behavior of a large number of different, real thrombi in humans in the training model. In addition, these are free of animal components.

Different thrombus models can be provided for training so that different training scenarios can be performed. The different human thrombi occurring in reality, especially with regard to real shape, can be represented at least with a certain diversity. Material properties, structural properties and combinations can be used to influence properties such as hardness, elasticity, the fragmentation properties and, if necessary, adhesion to a vessel model, thus achieving a wide range of different thrombus models for training purposes. In particular, the combination with additively manufactured structures and thus the setting of thrombus properties via the structure results in advantageous designs that allow the simulation of real shapes and dimensions.

According to the invention, a preferred material of Shore A hardness in the range of 0 to 10 is provided as specimens, in particular agarose or silicone rubber (silicones in the cross linked state) is provided to mimic thrombi, in particular in a neurointerventional training model, for example. The material comparative value of the aforementioned Shore hardness lies between the strength of gelatine (Shore A 0) and gummy bears (Shore A 10).

Special about Agarose is a high fragmentation in contact with a procedure instrument, while silicone rubber forms very compact thrombi. The properties of silicone rubber or agarose-based thrombus models can be optimized in the manufacturing process to produce a variety of realistic thrombi by combining materials and varying them by adding 5 to 40% by weight of an adhesive and/or a reinforcing material to form a composite structure. For this purpose, the silicone rubber or agarose base as starting material is first weighed and, based on this, wt. % of adhesive and/or other components are added. The adhesive can be used to increase elasticity. The reinforcing material, for example additively manufactured support structures and/or microglass beads, can be used to stabilize highly fragmenting agarose thrombi and/or to increase the fragmentation of silicone rubber-based thrombus models.

The mold in which the thrombus model can be produced can also influence the aforementioned properties. For example, the properties of models produced in a casting mold differ from those that are cured in a syringe and made available by passing them through the syringe cone. The above-mentioned properties can also be specifically influenced by storage, in that the adhesive properties of silicone thrombi can be reduced by storage in vegetable cooking oil, for example.

The preferred adhesive is chloromethylisothiazolinone (CMIT) and/or a mixture with methylisothiazolinone (MIT).

The design of the medical training model comprising synthetic thrombus models can be modular and can comprise standardized components (used in each training scenario), variant components (training scenario defining components) and patient specific components (adapted according to an original patient specific anatomy).

The advantageous use of real instruments can also be combined with equivalent physiological properties such as temperature, blood flow and pulsation. The high geometric freedom of additive or generative manufacturing processes enables the production of vessel models that are an exact three-dimensional replica of patient-specific vessel interiors. Consequently, to train a mechanical thrombectomy, a microcatheter can be inserted into a vascular system of a training model and a basket-like mesh—a so-called stent retriever—can be advanced via a guide wire to a vessel occluded with a synthetic thrombus model. The stent retriever is moved into position, captures the thrombus model, and is then withdrawn. Blood flow is restored with this mechanical removal.

Thus, the synthetic thrombus model according to the invention provides the following advantages: The development of an in vitro simulation model of thrombectomy treatments to avoid animal experiments is possible. A training environment for endovascular, stroke clinic procedures under standardized conditions with varying degrees of difficulty under real-world conditions is provided. The diversity of thrombi that occur can be mimicked. Adjustable properties can be represented by material properties, additives or structure. Structures can be obtained from additive manufacturing. Addition of adhesive chloromethylisothiazolinone and/or methylisothiazolinone (CMIT+MIT) generates a binder. The addition of microglass beads allows an increase in fragmentation. Different manufacturing processes and storage can be used. The product is non-toxic.

Further embodiments and advantages of the invention can be learned from the following description and the dependent claims.

The invention is explained in more detail below with reference to the embodiments shown in the accompanying figures.

The invention relates to a synthetic thrombus model for learning the surgical removal of a blood clot from a blood vessel by means of mechanical thrombectomy in a simulation of various stroke scenarios in a training model. The thrombus model simulates a lifelike shape having a realistic haptic of a human blood clot, by using an elongated basic substance based on an elastically deformable main material having a Shore A hardness in the range of 0 to 10, in particular 0 to 4, and the property profile of which being variable at least with respect to hardness and fragmentation by use of a material combination of the main material/starting material comprising at least one addition of an adhesive with 5 to 40% by weight and/or comprising a reinforcing material.

The elastically deformable main material is made from a hardened agarose gel base or silicone rubber base. The agarose gel base is preferably made from a 2% to 15% agarose gel. The adhesive contains a chloromethylisothiazolinone and/or a mixture with methylisothiazolinone.

The reinforcing material builds up a support structure, wherein the support structure/reinforcement structure can be formed as a spiral structure, wave structure, or spine-like structure. Additive manufacturing allows further differentiation and combination without any problems. A number of support structure elements can be placed in the base body in a spaced and separated manner having an orientation such that their longitudinal direction follows a longitudinal direction of the thrombus model.

The support structure may comprise microglass beads. Preferably, the support structure has an added portion of 10 to 40% by weight.

The elongated base body may have a reduced surface energy due to temporary storage in a vegetable edible oil, which reduces surface adhesion. The base body can be molded by a casting process or an injection molding process.

According to the invention, it is further provided to use the synthetic thrombus model in a training model by means of a catheter-based clinic testing procedures of stroke scenarios.

Figure 1:
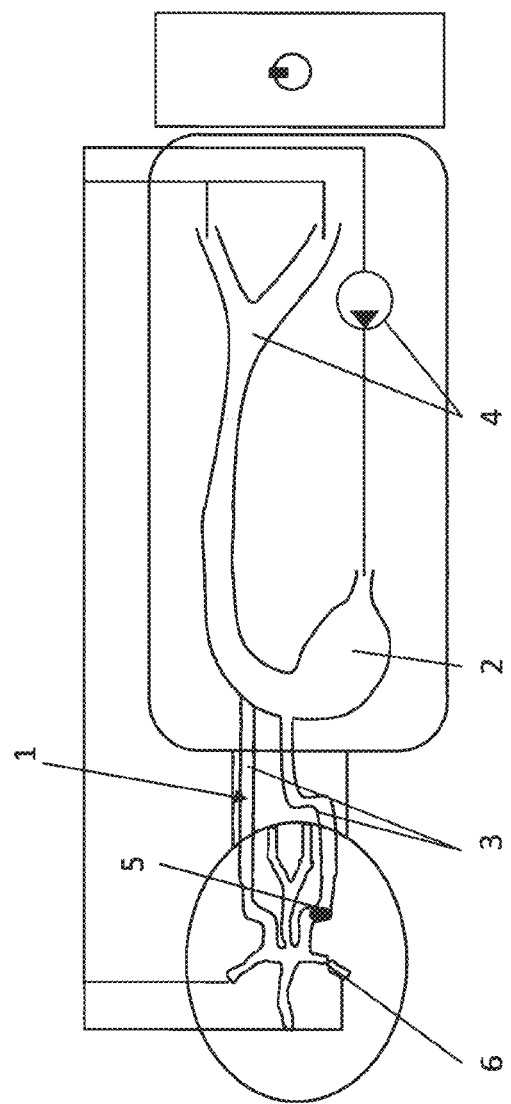
FIG. 1 shows a schematic diagram of a medical training model for simulating various stroke scenarios using thrombectomy, with a thrombus model placed in a cerebral vessel.

As FIG. 1 shows, such a training model comprises at least one relevant vascular tree 1 comprising a blood circulation replacement system 2, which has at least one training region 3 and is connectable to an anatomically replicated blood circulation replacement system 2 having a delivery system 4. For training of a mechanical thrombectomy comprising stent retrievers for capturing and removing a synthetic thrombus model 5, such one is also placeable in front of a stenosis 6. The blood circulation replacement system 2 may be designed to simulate a human blood circulation system in terms of fluid temperature and pressure.

A preferably modular basic structure of the training model allows the combination of modules, namely standardized or variant modules with exchangeable individualized modules. A main focus is on the integration of patient-specific and individualized geometries. Patient-specific aneurysm models or other practice fields 3, 6 can, for example, be manufactured additively, i.e. in a layer construction process or 3D printing, on the basis of medical image data from patients in a standardized individualization process. A portfolio of different aneurysm geometries or stenoses 6 are available as a basis for training.

Figure 2:
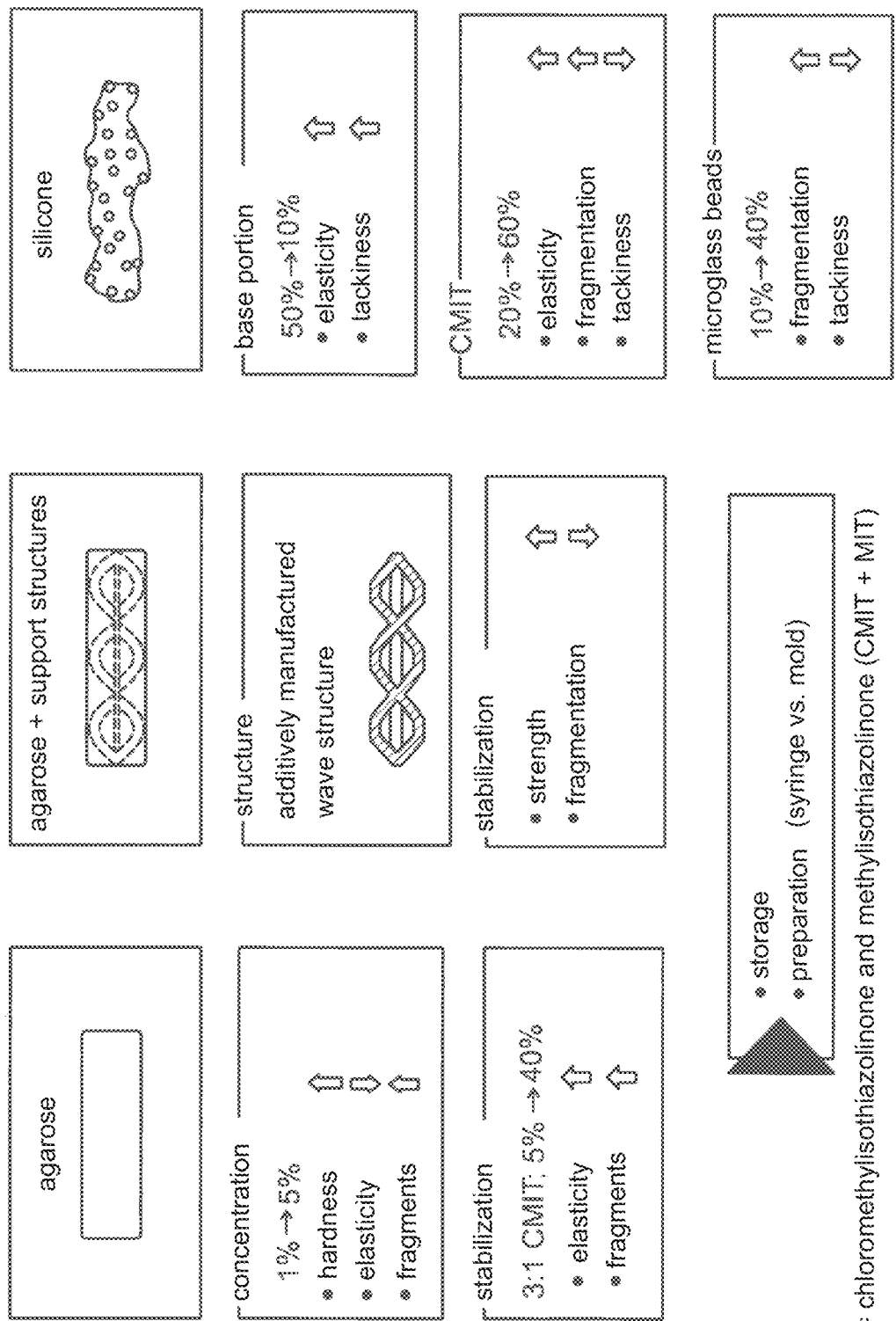
FIG. 2 shows an overview of the various parameters used to set the properties of the thrombus models according to the invention, such as in particular hardness, fragmentation, elasticity and tackiness, as well as their direction.

FIG. 2 describes the formation of agarose thrombi. For example, the agarose is prepared in 2, 5 or 10 wt %. The agarose can be heated in a solvent to above 95° C. and colored with food coloring at a ratio of 0.1 g to 25 g. The mixture can be cooled for 2 hours. The preparation can be done in two different ways. On the one hand, hardening can be carried out in a silicone tube, for example, with an inner diameter of 3 mm, and on the other hand, in the form of a block from which the thrombi are punched out. Further additives can be added before the agarose is gelled, for example at 34-38° C. This is used to give the agarose a more uniform consistency. This is used to add stabilizing components to the agarose. The stabilizing component added to the agarose is glue. This consists, for example, of a 3:1 mixture of chloromethylisothiazolinone (CMIT) and methylisothiazolinone (MIT). This additive helps to reduce fragmentation of the agarose without reducing elasticity. For this purpose, 1, 2 or 5% agarose mixtures can be prepared, to which in turn 5, 20 or 40 wt % CMIT+MIT are added. Agarose thrombi with 2% concentration and 5-20 wt % CMIT+MIT are particularly preferred.

Figure 3:
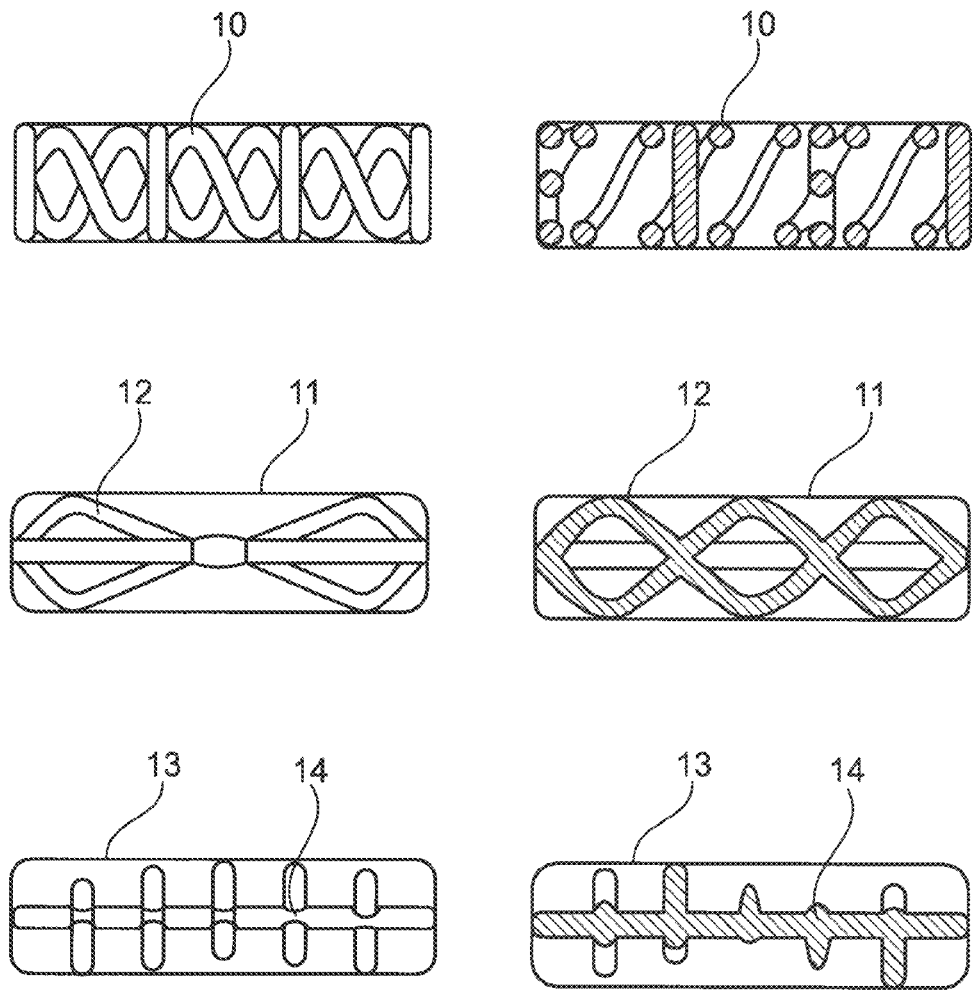
FIG. 3 shows various shapes of reinforcing materials as additives.

To stabilize highly fragmenting agarose thrombi, for example, three different structures can be provided as reinforcement material. The structures can be manufactured using additive manufacturing. The structures can be placed in a mold and the liquid agarose poured around them. FIG. 3 shows the three different shapes mentioned, for example. According to this, a first shape 10 is for example a spiral structure. This spiral structure preferably has two symmetrical spirals, which are offset by 180° and are connected to each other by an additional four rings with transverse connections. The diameter of the cut surface can be in the range of 0.5 mm. The cross-connection is intended to stabilize the model without significantly affecting its elasticity. The spirals and circles are intended to prevent compression of the agarose in the transverse direction, although compression in the longitudinal direction is possible. A cavity in the model is intended to allow piercing of the thrombus with a treatment instrument.

In addition to the shape of spirals, a corrugated structure 11 may be provided. The structure is made up of several, in particular three, waves and a continuous rod. The waves form a sine curve of, for example, 1.5 Pi. This results in three chambers 12, which are filled with agarose. The structure is advantageous in that the model is stable against compression in the longitudinal and transverse directions, but allows easy bending as well as perforability.

A third concept for the combination of agarose and support structure is based on a spine-like structure 13 comprising an elongated rod with spines having a diameter in the range of 0.5 mm. For additional stability, the junctions may be reinforced by spheres 14. Fragmentation of the agarose can be reduced by the barbed structure by means of absorption of the loads in the transverse direction. The structure may be designed to allow slight bending as well as perforation of the model.

Agarose thrombi with a material combination of agarose and support structure as described above form hard, calcium-rich thrombi.

FIG. 2 also shows silicone thrombi based on silicone rubber as synthetic thrombus models. Silicone models with a base portion in the range of 10 to 50% by weight of pure silicone of Shore hardness (ShA) 0 are dimensionally stable. A base portion of 30 to 40% by weight is particularly advantageous, since elasticity is then high with moderate tack (adhesion). By adding adhesive in the range of 20 to 60 wt. %, the models show greater deformation, increased fragmentation under compression and decrease in tack. This applies in particular to the adhesive CMIT as well as to mixtures of CMIT with MIT. An addition of 30 to 50% by weight of CMIT or CMIT+MIT is particularly advantageous. In this respect, the increase in elasticity is advantageous. In order to reduce excessive adhesion of the models to the artificial vessel models and thus unrealistic rolling along the vessel wall, the stickiness of the models can be reduced by storing the produced thrombus models in sunflower oil. Furthermore, it is possible to add microglass beads also with 10 to 40 wt. %. The addition of microglass beads also reduces stickiness. The addition of 10 to 20 wt. % microglass beads is particularly preferred. When subjected to mechanical stress, the models with microglass beads exhibit increased fragmentation and deformation. The silicone thrombi produced in this way reproduce the behavior of soft and compact thrombi, which predominantly fragment only when subjected to significant mechanical stress.

As a material combination for a soft and compact thrombus model, particularly advantageous is 30 to 35 wt. % of pure silicone ShA 0 as silicone base and main material for a base body of silicone rubber, the addition of adhesive with 30 to 40 wt. %, in particular CMIT or CMIT+MIT and preferably a temporary storage in a vegetable oil. For the formation of a thrombus model, which should tend to fragmentation, the addition of micro glass beads with 10 to 20 wt. % is further advantageous.

To produce a soft silicone with Shore A hardness (ShA) of 0 to 10, an additive cold-curing silicone elastomer is preferably mixed with a base and catalyst, for example in a ratio of 1 to 1, and the liquid silicone mixture is cured for several hours. The amount of catalyst can then be selected to also influence the degree of softness of the model. The mixing and curing process offers the possibility of influencing the properties of the silicone by changing the mixing ratio of base and catalyst or adding further components. Thus, the elasticity and tackiness of the silicone can be changed if the mixing ratio of base and catalyst is varied.

To increase the fragmentation property, micro glass beads with a diameter of preferably 0.25 to 0.5 mm can be added to the silicone models.

The silicone models can be produced in a mold. Preferably, the thrombus models produced in this way have, for example, a diameter of 2.5 to 3.5 mm and a length of 8 to 15 mm. On the other hand, the liquid silicone mixture can be transferred to a syringe for curing and pressed out of the syringe from there after the silicone has cured, the dimensions mentioned above being selected.

The invention claimed is:

1. A synthetic thrombus model for learning a surgical removal of a blood clot from a blood vessel using mechanical thrombectomy in a simulation of various stroke scenarios in a training model, the synthetic thrombus model comprising:
an elongated base body formed from an elastically deformable main material having a Shore A hardness in a range of 0 to 10, wherein the elastically deformable main material comprises agarose or silicone rubber; and
an adhesive present in an amount of 5 to 40% by weight, wherein the adhesive comprises chloromethylisothiazolinone (CMIT), a mixture of CMIT and methylisothiazolinone (MIT), or both, and wherein the adhesive is combined with the elastically deformable main material to improve at least the hardness and fragmentation properties of the synthetic thrombus model.

2. The synthetic thrombus model of claim 1, wherein the elastically deformable main material is formed by a gelled agarose base.

3. The synthetic thrombus model of claim 2, wherein the gelled agarose base is prepared with a concentration of 2% to 5%.

4. The synthetic thrombus model of claim 1, wherein the elastically deformable main material is agarose, present in a concentration of 2% to 3%, and the adhesive is a mixture of CMIT and MIT present in an amount of 5% to 20% by weight.

5. The synthetic thrombus model of claim 1, wherein the elastically deformable main material is silicone rubber, comprising a silicone base portion having Shore A hardness 0 in an amount of 30% to 35% by weight, and an adhesive comprising CMIT and/or MIT present in an amount of 30% to 40% by weight.

6. The synthetic thrombus model of claim 1, wherein the synthetic thrombus model further comprises a reinforcing material forming a support structure within the elongated base body.

7. The synthetic thrombus model of claim 6, wherein the support structure is formed as a spiral structure, wave structure, or spike-like structure, a respective longitudinal extension of which follows a longitudinal extension of the elongated base body.

8. The synthetic thrombus model of claim 6, wherein the support structure comprises micro glass beads.

9. The synthetic thrombus model of claim 6, wherein the support structure is present in an amount of 10% to 40% by weight.

10. The synthetic thrombus model of claim 1, wherein the elongated base body has reduced surface adhesion behavior due to temporary storage in a vegetable edible oil.

11. The synthetic thrombus model of claim 1, wherein the elongated base body is shaped by a casting process or an injection molding process.

12. A synthetic thrombus model for learning a surgical removal of a blood clot from a blood vessel using mechanical thrombectomy in a simulation of various stroke scenarios in a training model, the synthetic thrombus model comprising:
  an elongated base body formed from an elastically deformable main material having a Shore A hardness in a range of 0 to 10, wherein the elastically deformable main material comprises agarose or silicone rubber; and
  a reinforcing material forming a support structure within the elongated base body, wherein the support structure is formed as a spiral structure, wave structure or spike-like structure, a respective longitudinal extension of which follows a longitudinal extension of the elongated base body.

13. The synthetic thrombus model of claim 12, wherein the elastically deformable main material is formed by a gelled agarose base.

14. The synthetic thrombus model of claim 13, wherein the gelled agarose base is prepared with a concentration of 2% to 5%.

15. The synthetic thrombus model of claim 12, further comprising an adhesive present in an amount of 5% to 40% by weight, wherein the adhesive comprises chloromethylisothiazolinone (CMIT), a mixture of CMIT and methylisothiazolinone (MIT), or both.

16. The synthetic thrombus model of claim 15, wherein the adhesive is a mixture of CMIT and MIT present in an amount of 5% to 20% by weight.

17. The synthetic thrombus model of claim 15, wherein the support structure comprises micro glass beads.

18. The synthetic thrombus model of claim 17, wherein the support structure is present in an amount of 10% to 40% by weight.

19. The synthetic thrombus model of claim 12, wherein the elongated base body has reduced surface adhesion behavior due to temporary storage in a vegetable edible oil.

20. The synthetic thrombus model of claim 12, wherein the elongated base body is shaped by a casting process or an injection molding process.

* * * * *